United States Patent [19]
Klotz et al.

[11] Patent Number: 5,191,292
[45] Date of Patent: Mar. 2, 1993

[54] METHOD OF MAKING A SENSOR CABLE

[75] Inventors: Sheldon M. Klotz, Fremont; Michael Masia; Cynthia A. Tomlinson, both of Redwood City, all of Calif.

[73] Assignee: Raychem Corporation, Menlo Park, Calif.

[21] Appl. No.: 769,561

[22] Filed: Oct. 2, 1991

Related U.S. Application Data

[63] Continuation of Ser. No. 514,500, Apr. 26, 1990, abandoned.

[51] Int. Cl.⁵ .............................................. G01N 27/06
[52] U.S. Cl. ..................................... 324/446; 324/425; 324/439; 324/722; 324/92; 174/27; 29/868
[58] Field of Search ................. 324/425, 439, 446, 92, 324/93, 94, 691, 722; 174/9 R, 9 F, 11 R, 24, 27, 98; 29/825, 868

[56] References Cited

U.S. PATENT DOCUMENTS

| | | | |
|---|---|---|---|
| 349,893 | 9/1886 | McGill | 174/27 X |
| 700,107 | 5/1902 | West | 174/27 |
| 2,830,945 | 4/1958 | Keidel | 324/446 |
| 3,569,824 | 3/1971 | Ruse | 324/439 |
| 3,603,715 | 9/1971 | Eilhardt | 174/27 X |
| 4,240,026 | 12/1980 | Murphy et al. | 324/425 X |
| 4,626,786 | 12/1986 | Bödecker et al. | 324/446 X |
| 4,922,183 | 5/1990 | Kamas | 324/694 |
| 4,926,129 | 5/1990 | Wasley | 324/555 |
| 4,926,165 | 5/1990 | Lahlouh | 340/603 |
| 5,015,958 | 5/1991 | Masia et al. | 324/522 |

Primary Examiner—Jack B. Harvey
Assistant Examiner—Glenn W. Brown
Attorney, Agent, or Firm—Marguerite E. Gerstner; Timothy H. P. Richardson; Herbert G. Burkard

[57] ABSTRACT

A sensor cable for detecting the presence of electrically conductive liquids, e.g. water. The cable has decreased sensitivity to contamination and condensation than conventional cables which are covered by braids. First and second elongate conductors are positioned in first and second channels which partially surround the conductor and are part of first and second insulating support members; each channel has at least one shoulder which extends outwardly from the channel beyond the conductor. The channels are positioned so that when the cable is placed on a flat substrate in any position, neither the first nor the second conductor contacts the flat surface and at least one first shoulder and at least one second shoulder make intermittent contact with the flat surface. In a preferred embodiment, the first and second conductors follow a generally spiral path down the length of the cable. When the cable is immersed in an electrically conductive liquid, the liquid provides an electrical connection between the first and second conductors.

16 Claims, 1 Drawing Sheet

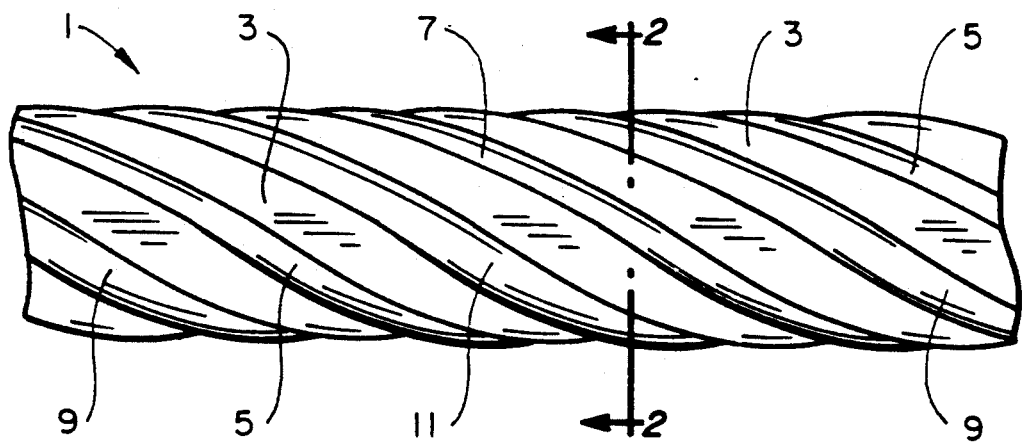
FIG_1
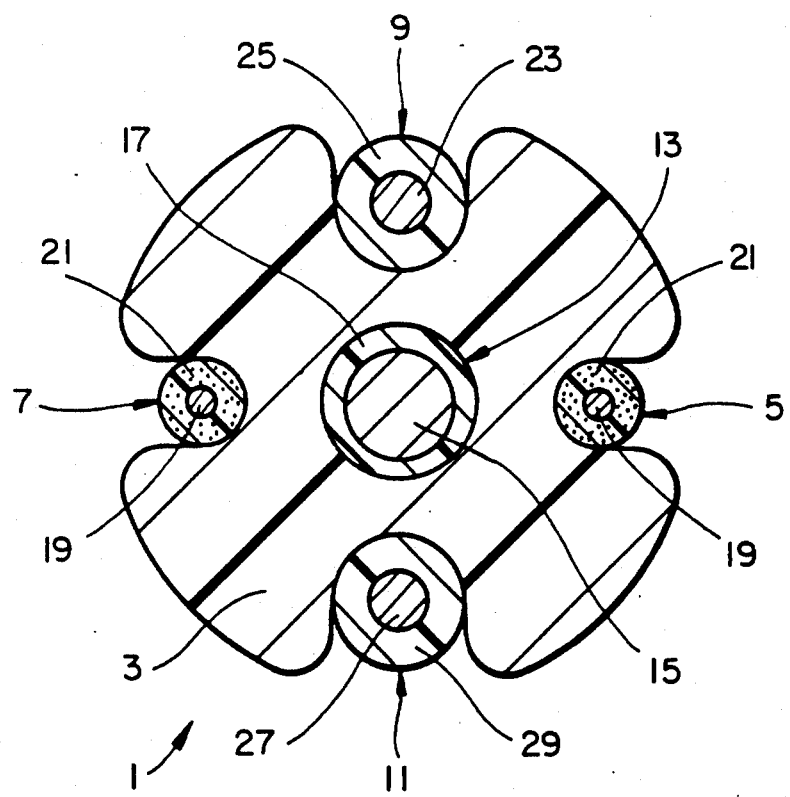
FIG_2

METHOD OF MAKING A SENSOR CABLE

This application is a continuation of application Ser. No. 07/514,500 filed Apr. 26, 1990, now abandoned.

BACKGROUND OF THE INVENTION

Field of the Invention

This invention relates to methods of making sensor cables.

Introduction to the Invention

Sensor cables and assemblies comprising sensor cables are wellknown. Such sensors may be used to detect changes in variables along an elongate path, e.g. the presence of a liquid such as water or an organic solvent, the attainment of a predetermined temperature or pressure, the presence or absence of light or another form of electromagnetic radiation or a change in the physical position of a movable member, e.g. a valve in a chemical process plant or a window in a building fitted with a burglar alarm system. Changes of this kind are referred to in this specification by the generic term "event". Reference may be made, for example, to U.S. Pat. Nos. 1,084,910 (Stephenson), 2,581,213 (Spooner), 2,691,134 (Ford), 3,248,646 (Brazee), 3,382,493 (Loper et al), 3,470,340 (Hakka), 3,564,526 (Butts), 3,800,216 (Hamilton), 3,991,413 (Berger), 4,278,931 (Huggins), 4,400,663 (May), and 4,580,477 (Sugibuchi), British Patent Nos. 182,339, 1,355,176, and 1,481,850, German Offenlegunschriften Nos. 3,001,150 and 3,225,742, European Patent Application Publication Nos. 133,748, 144,211, 160,440, 160,441, 164,838, 191,547, 250,776, and 253,085, and copending, commonly assigned application Ser. Nos. 838,725 (Lahlouh et al, filed Mar. 11, 1986), now U.S. Pat. No. 4,926,165 (issued May 15, 1990), Ser. No. 202,278 (Kamas, filed Jun. 3, 1988) now U.S. Pat. No. 4,922,183 (issued May 1, 1990), Ser. No. 256,874 (Wasley et al, filed Oct. 12, 1988) now U.S. Pat. No. 4,926,129 (issued May 15, 1990), and Ser. No. 372,179 (Masia et al, filed Jun. 27, 1989), now U.S. Pat. No. 4,015,958 (issued May 14, 1991). The disclosure of each of the patents, applications, and publications referred to above is incorporated herein by reference.

SUMMARY OF THE INVENTION

This invention provides a novel method of making a sensor cable, said method comprising (1) providing an elongate core member whose outer surface comprises a deformable insulating material; (2) wrapping a first elongate conductor spirally around the core member so that a first spiral portion of said deformable material is deformed by pressure exerted on it by the first elongate conductor and thus provides (i) a first channel which partially surrounds the first conductor and (ii) at least one first shoulder extending outwardly beyond the first conductor; and (3) wrapping a second elongate conductor spirally around the core member so that it is spaced apart from the first conductor and so that a second spiral portion of said deformable material is deformed by pressure exerted on it by the second elongate conductor and thus provides (i) a second channel which partially surrounds the second conductor and (ii) at least one second shoulder extending outwardly beyond the second conductor; the first and second elongate conductors having exposed surfaces which, if the product of step (3) is immersed in an electrically conductive liquid, are contacted by the liquid, the liquid thus providing an electrical connection between the first and second conductors.

BRIEF DESCRIPTION OF THE DRAWING

FIG. 1 is a plan view of a sensor cable made by the method of the invention; and FIG. 2 cross-sectional view of a sensor cable made by the method of the invention along line 2—2 of FIG. 1.

DETAILED DESCRIPTION OF THE INVENTION

Sensor cables made by the method of this invention can be used to detect the presence of electrically conductive liquids. Such liquids are most commonly electrolytes, i.e. liquids in which an electrical connection is made by means of ions. Suitable liquids include water, aqueous acids, aqueous bases, and other ionic solutions in which the charge-carrying entities are ions.

The sensor cable comprises a first elongate conductor and second elongate conductor, each of which has an exposed surface which can be contacted by the electrically conductive liquid when the cable is immersed in the liquid. The first and second conductors may be the same or different in composition, construction, and size. For most applications, and for ease of manufacture, it is preferred that the first and second conductors be same. Particularly preferred are conductors in which a metal core, e.g. a solid or stranded metal wire or metal braid made from copper, nickel, tin-plated copper, metal alloys such as Copel ™, or other suitable material, is electrically surrounded by a conductive polymer. The conductive polymer, i.e. a composition which comprises a polymeric matrix in which is dispersed a particulate conductive filler, preferably completely surrounds the metal core and is in good electrical and physical contact with it. Any conductive polymer composition may be used, although for many applications it is preferred that the polymer be selected for its solvent and chemical resistance to materials with which it may come in contact. A useful polymer for many applications is polyvinylidene fluoride. Any suitable conductive filler may be used, e.g. carbon black, graphite, metal, metal oxide, particles of conductive polymer, or a mixture thereof. In addition, the conductive polymer composition may contain inert fillers, crosslinking agents, plasticizers, lubricants, or other process aids. The appropriate resistivity level of the composition will vary depending on the application, but is commonly in the range 0.1 to 20,000 ohm-cm, particularly 1 to 1,000 ohm-cm, especially 1 to 250 ohm-cm. If the polymer is one which swells on use, the resistivity of the conductive polymer is measured prior to swelling. For some applications the stability of the conductor can be improved and its sensitivity to vapor and temperature can be decreased by crosslinking the conductive polymer on one or both conductors. Crosslinking may be achieved by irradiation or chemical means. Suitable levels of irradiation are 2 to 30 Mrads, particularly 5 to 15 Mrads, e.g. about 7.5 Mrads. The polymer may be crosslinked to the same level throughout its thickness or to different levels. Depending on the application, the size of the metal core and the thickness of the conductive polymer coating can vary. In order to have adequate flexibility, it is preferred that the outer diameter of the first and the second conductors be 0.010 to 0.500 inch (0.025 to 1.27 cm), particularly 0.020 to 0.200 inch (0.051 to 0.508 cm), especially 0.025 to 0.100 inch (0.064 to 0.254 cm), e.g. 0.025 to 0.060 inch (0.064 to 0.152 cm).

The first elongate conductor is positioned in a first channel of the one member. The first channel, which may be of any suitable shape, partially surrounds the first conductor and allows exposure of the first conductor to the liquid. At least one, and preferably two, first shoulders extend outwardly beyond the first conductor in order to prevent the first conductor from protruding from the channel and being abraded during installation and use. The extent to which the shoulder protrudes beyond the conductor may be small, e.g. 0.002 to 0.020 inch (0.005 to 0.051 cm), although the design of the shoulder will determine the extent of the protrusion. Any distance which is sufficient to protect the conductor is acceptable.

The second conductor is positioned in a second channel in the core member in a similar manner to the first conductor. At least one, and preferably two, shoulders extend outwardly beyond the second conductor to protect the second conductor. The dimensions of the second conductor and the second channel may be the same or different from those of the first conductor and first channel. The core member has an outer surface comprising a deformable insulating material. Particularly preferred is a core member in which the outer surface comprises a polymer which has a softening point at a temperature $T_s$. This softening point $T_s$ can be measured by a Vicat test as the temperature in which an indentor under a fixed load penetrates a specified distance into the material. The polymer can be a thermoplastic, e.g. polyvinylidene fluoride, or an elastomer, e.g. thermoplastic elastomer (TPR), or a blend of materials depending on the physical and thermal properties desired for the application. Deformation of the material is preferably achieved by heating to a temperature above $T_s$. For many thermoplastic materials it is desirable to heat the material to a temperature which is above $T_s$ but is below the melting point $T_m$, i.e. the temperature at the peak of the DSC curve measured on the material. This allows the material to soften in order to be deformed but prevents the material from melting and dripping off the core member. In some cases, it is possible to crosslink the outer surface of the core material to a low level thus preventing it from flowing off the core member, but still allowing it to be deformed. Heating can be achieved by any suitable means, e.g. radiant heat, microwave heating, or induction heating. For many applications, it is desirable that the core member comprise a central support member, e.g. a metal wire or a polymer fiber, which is surrounded by the deformable material. This central support member provides physical reinforcement of the core member, and, if it is conductive as in the case of a wire, can be used as part of an electrical circuit to detect faults or breaks in one of the conductors or any other elongate components.

The first and the second conductors are spaced apart from one another. If an electrically conductive liquid contacts both the first and the second conductors, an electrical connection is made between them. Therefore, if the sensor is used to detect a liquid with a given electrical conductivity, the distance between the first and second conductors controls the minimum size of the leak which can be detected. For most applications it is preferred that leaks be detected when they are relatively small in order to minimize damage. Thus although the distance between the wires is dependent on the size of the first and second elongate insulating support members, the wires are generally spaced apart at their closest point by less than 12 inches (30.5 cm), preferably less than 6 inches (15.24 cm), particularly less than 1.0 inch (2.54 cm), especially less than 0.5 inch (1.27 cm), most especially less than 0.1 inch (0.25 cm), e.g. 0.025 to 0.100 inch (0.064 to 0.25 cm).

The first and second conductors follow a generally spiral path down the length of the cable, wrapped around the core member. In this specification, the term "spiral" means any form of progression of the conductor down the length of the cable, whether the pitch is constant or varies, and whether the progression is regular or irregular. If the outer surface of the core member is heated to a temperature sufficient to deform the deformable material, when the first and second conductors are wrapped around the core member, they become embedded into the deformable material and form first and second channels. By managing the temperature of the deformable material, the tension on the first and second conductors, and the rate of the wrapping, the depth of the channels and the distance between them can be controlled. It is necessary to have conditions which allow the conductors to penetrate the deformable material to a depth greater than the diameter of each conductor in order to provide first and second shoulders extending beyond each conductor. Such shoulders are formed by the displacement of the deformable material as the conductors press into it. This technique, in which the conductor "carves" the channel, allows the conductors to be positioned securely within each channel and prevents them from sliding out. By controlling the rate at which the conductors are wrapped, the distance required for one complete spiral wrap of a conductor (i.e. the pitch) can be regulated and the resistivity of the cable controlled. In addition, when the core member comprises a central support member, the central support member can act as a barrier to control the position of the conductor in the channel, preventing it from moving too far into the core member. While the two conductors can be wrapped around the core member in separate operations, it is often most efficient to wrap both simultaneously. To improve the ease of deformation of the deformable material, the conductors, the deformable material, or both can be heated prior to or during the wrapping operation.

Sensor cables made by the method of this invention does not have a preferred orientation and can be used in any attitude. Thus when a product of step (3) of the method, in any attitude, is placed upon a flat surface, neither the first conductor nor the second conductor contacts the flat surface and at least one first shoulder makes intermittent contact with the flat surface and at least one second shoulder makes intermittent contact with the flat surface. In addition, the distance between the exposed surface of the first conductor and the flat surface varies between a minimum and a maximum along the length of the cable, and the distance between the exposed surface of the second conductor and the flat surface varies between a minimum and a maximum along the length of the cable. In a preferred construction, the positions of the first and second conductors are balanced, i.e. the cable can be bent equally easily in any direction. For many embodiments, the first and second conductors are equidistant from the central axis of the conductor. Thus if the core member has a generally circular shape, the first conductor and the second conductor are on opposite sides of the core member diameter rather than adjacent to one another.

For some applications, it is useful to monitor for the presence, and in some cases, the exact location of the leak. By the use of the proper electronic components connected to the first and second conductors and to one or more elongate insulating wires, the exact location of the electrical connection produced at the site of the leak can be determined. A preferred embodiment is a four-wire system in which a first elongate insulating wire acts as a return wire to a voltage meter and a second elongate insulating wire acts as an auxiliary wire. If elongate insulating wires are present, they comprise a central wire which is surrounded by an insulating material, e.g. polymer. A first, as well as a second, insulating wire can be wrapped around the core member separately or at the same time as the one or both of the first and second conductors are wrapped. Alternatively, if the central support member is an insulated wire, it can be used in place of one of the first and second insulating wires. It is preferred that the first and second insulating wires are balanced, i.e. that they form part of a symmetrical cable, equi-spaced from one another and from each of the first and second conductors. Documents which describe suitable electronics and methods of detecting the location of a leak are European Patent Application Publication Nos. 133,748, 144,211, 160,440, 160,441, 164,838, 250,776, and 253,085, and copending, commonly assigned application Ser. Nos. 838,725 (Lahlouh et al, filed Mar. 11, 1986), now U.S. Pat. No. 4,926,165 (issued May 15, 1990), Ser. No. 202,278 (Kamas, filed Jun. 3, 1988), and Ser. No. 256,874 (Wasley et al, filed Oct. 12, 1988) now U.S. Pat. No. 4,926,129 (issued May 15, 1990), and particularly application Ser. No. 372,179 (Masia et al, filed Jun. 27, 1989) now U.S. Pat. No. 5,015,958 (issued May 14, 1991). The disclosure of each of these patent applications and publications is incorporated herein by reference. When cables made by the method of the invention are used to monitor the presence of an electrically conductive liquid which is adjacent to a substrate, the cable can be positioned on the substrate so that neither the first conductor nor the second conductor contacts the substrate, the distance between the exposed surface of the first conductor and the substrate and the distance between the exposed surface of the second conductor and the substrate vary between a minimum and a maximum along the length of the cable, and at least one first shoulder and at least one second shoulder make intermittent contact with the substrate. The signal system, which comprises at least one first insulating wire and possibly one second insulating wire, provides a signal when the presence of the liquid adjacent to the substrate results in electrical connection between the first and second conductors.

The invention is illustrated by the drawing in which FIG. 1 shows a plan view of a sensor cable 1 made by the method of the invention. A core member 3 is wrapped in a spiral pattern with a first elongate conductor 5 which is a locating wire, a first elongate insulating wire 9 which is a continuity wire, a second elongate conductor 7 which is a source wire, and a second elongate insulating wire 11 which is a signal wire. Each of the wires is embedded into the core member 3 to a depth sufficient to prevent the wires from protruding above the surface of the core member.

FIG. 2 is a cross-sectional view of the sensor cable 1 along line 2—2 of FIG. 1. In this embodiment, deformable polymeric material comprises the core member 3 and surrounds a central support member 13 which comprises a center conductor 15 and an insulating polymeric layer 17. The first conductor 5 and second conductor 7 are embedded into the core member 3. Each conductor 5,7 comprises a center conductor 19, either a solid or a stranded wire, surrounded by a layer of conductive polymer 21. The first insulating wire 9 which is the continuity wire comprises a center conductor 23 surrounded by an insulating polymer layer 25 and the second insulating wire 11 which is the signal wire comprises a center conductor 27 surrounded by an insulating polymer layer 29.

The invention is illustrated by the following example.

EXAMPLE

An elongate conductor wire was prepared by extruding a 0.011 inch (0.028 cm) layer of carbon-filled polyvinylidene fluoride over a first 30 AWG (0.010 inch/0.025 cm diameter) solid Copel ™ conductor to give an outer diameter of approximately 0.032 inch (0.081 cm). An insulating wire was prepared by extruding a first layer of polyethylene and a second layer of polyvinylidene fluoride over a 24 AWG (0.025 inch/0.064 cm diameter) stranded tin-plated copper wire to give an outer diameter of approximately 0.054 inch (0.137 cm). The polymer layers were then irradiated to 10 to 15 Mrad. A central support member was prepared by extruding two layers of ethylene/tetrafluoroethylene copolymer to a total of 0.008 inch (0.020 cm) over a 16 AWG (0.060 inch/0.152 cm) diameter stranded nickel-plated copper wire to give an outer diameter of approximately 0.077 inch (0.196 cm).

Using a 1.5 inch (3.8 cm) extruder, a core member was prepared by extruding an 0.060 inch (0.152 cm) layer of thermoplastic elastomer (TPR ™ 5490, available from BP Performance Polymers) over one central support member. The resulting core member had an outer diameter of 0.195 to 0.201 inch (0.495 to 0.511 cm). The plastic of the core member was softened by passing the core member through a 3-foot (91 cm) long radiant heater heated to 580° C. at a rate of 9 to 10 feet/min (2.74 to 3.05 m/min). The softened core member then travelled 2.5 feet (76 cm) through ambient air before entering a wrapping head. Two elongate conductor wires and two insulating wires were wrapped at an equal spacing (approximately 0.157 inch/0.40 cm from wire center to wire center) in a spiral pattern around the carrier rod at a pitch of about 0.400 inch (1.02 cm). The resulting cable had the pattern of a first conductor, a first insulating wire (the continuity wire), a second conductor, and a second insulating wire (the signal wire). The tension of each wire was adjusted to a level at which each wire was forced into the softened deformable polymer of the core member to a depth sufficient to prevent any protrusion of the wire above the surface of the core member. The resulting sensor cable had a maximum diameter of approximately 0.250 inch (0.635 cm).

What is claimed is:

1. A method of making a sensor cable, said method comprising
    (1) providing an elongate core member whose outer surface comprises a deformable insulating material;
    (2) wrapping a first elongate conductor spirally around the core member so that a first spiral portion of said deformable material is deformed by pressure exerted on it by the first elongate conductor and thus provides (i) a first channel which partially surrounds the first conductor and (ii) at least one first shoulder extending outwardly beyond the first conductor; and (3) wrapping a second elongate conductor spirally around the core member so that it is spaced apart from the first conductor and so that a second spiral portion of said deformable material is deformed by pressure exerted on it by the second elongate conductor and thus provides (i) a second channel which partially surrounds the second conductor and (ii) at least one second shoulder extending outwardly beyond the second conductor;

the first and second elongate conductors having exposed surfaces which, if the product of step (3) is immersed in an electrically conductive liquid, are contacted by the liquid, the liquid thus providing an electrical connection between the first and second conductors.

2. A method according to claim 1 wherein the first and second conductors are wrapped around the core member at the same time.

3. A method according to claim 1 wherein said deformable material comprises a polymer which has a softening point at a temperature $T_s$ and is heated to a temperature greater than $T_s$ while the first and second conductors are being wrapped around the core member.

4. A method according to claim 3 wherein the deformable material comprises polyvinylidene fluoride.

5. A method according to claim 3 wherein the deformable material comprises thermoplastic elastomer.

6. A method according to claim 1 wherein the core member comprises a central support member which is surrounded by said deformable material.

7. A method according to claim 6 wherein the central support member is a wire, and the deformable material is an insulating polymer.

8. A method according to claim 1 wherein the first elongate conductor and the second elongate conductor are wrapped around the core member to produce a balanced configuration.

9. A method according to claim 1 wherein the first spiral portion of the deformable material provides two first shoulders extending outwardly beyond the first conductor.

10. A method according to claim 1 wherein the second spiral portion of the deformable material provides two second shoulders extending outwardly beyond the second conductor.

11. A method according to claim 1 wherein at least one of the first and the second elongate conductors comprises a metal core electrically surrounded by a conductive polymer.

12. A method according to claim 11 wherein each of the first and the second elongate conductors comprises a metal core electrically surrounded by a conductive polymer.

13. A method according to claim 1 which further comprises (4) wrapping a first elongate insulated wire spirally around the core member so that it is spaced apart from the first and second elongate conductors and so that a third spiral portion of said deformable material is deformed by pressure exerted on it by the first insulated wire and provides (i) a third channel which partially surrounds the first elongate insulated wire and (ii) at least one third shoulder extending outwardly beyond the first insulated wire; and (5) wrapping a second elongate insulated wire spirally around the core member so that it is spaced apart from the first and second elongate conductors and from the first insulating wire and so that said deformable material is deformed by pressure exerted on it by the second insulated wire and provides (i) a fourth channel which partially surrounds the second elongate insulated wire and (ii) at least one fourth shoulder extending outwardly beyond the second insulated wire.

14. A method according to claim 13 wherein the first insulating wire and the second insulating wire are wrapped around the core member to produce a balanced configuration.

15. A method according to claim 13 wherein the first and second conductors and the first and second insulating wires are wrapped around the core member at the same time.

16. A method according to claim 15 wherein said deformable material comprises a polymer which has a softening point at a temperature $T_s$ and is heated to a temperature greater than $T_s$ while the first and second conductors and the first and second insulated wires are wrapped around the core member.

* * * * *